United States Patent
Ruan et al.

(10) Patent No.: US 11,030,260 B2
(45) Date of Patent: Jun. 8, 2021

(54) SYSTEM AND METHOD FOR DYNAMICALLY NORMALIZED SEMANTIC DISTANCE AND APPLICATIONS THEREOF

(71) Applicant: IP.com I, LLC, Fairport, NY (US)

(72) Inventors: Wen Ruan, Manlius, NY (US); Samuel C. Baxter, Brewster, MA (US); James Thomas Durkin, Pittsford, NY (US); William Yurich Fowlkes, Pittsford, NY (US)

(73) Assignee: IP.COM I, LLC, Fairport, NY (US)

( * ) Notice: Subject to any disclaimer, the term of this patent is extended or adjusted under 35 U.S.C. 154(b) by 227 days.

(21) Appl. No.: 16/116,007

(22) Filed: Aug. 29, 2018

(65) Prior Publication Data

US 2020/0073950 A1    Mar. 5, 2020

(51) Int. Cl.
*G06F 16/00*    (2019.01)
*G06F 16/93*    (2019.01)
*G06F 16/22*    (2019.01)
*G06F 16/245*    (2019.01)
*G06F 16/2457*    (2019.01)

(52) U.S. Cl.
CPC .............. *G06F 16/93* (2019.01); *G06F 16/22* (2019.01); *G06F 16/245* (2019.01); *G06F 16/24578* (2019.01)

(58) Field of Classification Search
CPC .. G06F 16/22; G06F 16/245; G06F 16/24578; G06F 16/3332; G06F 16/334; G06F 16/93
See application file for complete search history.

(56) References Cited

U.S. PATENT DOCUMENTS

| 10,073,890 | B1 | 9/2018 | Khamis et al. |
| 2008/0114750 | A1 | 5/2008 | Saxena et al. |
| 2012/0233128 | A1* | 9/2012 | Solmer .................. G06F 16/28 |
| | | | 707/661 |
| 2012/0265787 | A1 | 10/2012 | Hsu et al. |
| 2015/0049943 | A1* | 2/2015 | Hamsici ............... G06K 9/4676 |
| | | | 382/170 |

(Continued)

FOREIGN PATENT DOCUMENTS

| KR | 10-2017-0138333 A | 12/2017 |
| WO | 2015-153512 A1 | 10/2015 |

OTHER PUBLICATIONS

International Search Report and Written Opinion dated Dec. 10, 2019 in International Application PCT/US2019/046799.

(Continued)

*Primary Examiner* — Dinku W Gebresenbet
(74) *Attorney, Agent, or Firm* — Pillsbury Winthrop Shaw Pittman LLP

(57) ABSTRACT

The present teaching relates to method and system for assessing semantic distance. A query is received and processed, by a document representation constructor, to obtain a first query representation. The query is then processed by a query representation constructor to obtain a second query representation. Based on the first and second query representations, a dynamic norm is determined. Based on the second query representation, a plurality of documents are identified as being related to the query and a semantic distance between the query and the plurality of documents is determined based on the dynamic norm.

21 Claims, 17 Drawing Sheets

(56) References Cited

U.S. PATENT DOCUMENTS

| | | | |
|---|---|---|---|
| 2015/0269693 A1* | 9/2015 | Geigel | G06Q 50/184 |
| | | | 705/310 |
| 2017/0293676 A1 | 10/2017 | Lowe et al. | |
| 2017/0351710 A1 | 12/2017 | Zhu et al. | |
| 2018/0189307 A1* | 7/2018 | Yu | G06F 16/13 |

OTHER PUBLICATIONS

Stewart Rogers, "Loci is using blockchain technology to tell you if your invention is unique," https://venturebeat.com/2018/07/12/loci-is-using-blockchain-technology-to-tell-you-if-your-invention-is-unique/, Jul. 12, 2018.

XLPAT Labs, Novelty Checker and Ideation Tool, downloaded Mar. 3, 2020, https://en.xlpat.com/novelty-checker/.

International Preliminary Report on Patentability dated Mar. 11, 2021 in International Application PCT/US2019/046799.

\* cited by examiner

SYSTEM AND METHOD FOR DYNAMICALLY NORMALIZED SEMANTIC DISTANCE AND APPLICATIONS THEREOF

BACKGROUND

1. Technical Field

The present teaching generally relates to data processing. More specifically, the present teaching relates to semantic analysis of documents and applications thereof.

2. Technical Background

In the age of the Internet, the amount of data available becomes explosive. Great effort has been made to analyze the vast amount of data to make some sense out of it in order to improve the efficiency associated with data access. For example, semantic relationships among different documents may be applied in order to recognize which documents are similar in semantics of the contents.

FIGS. 1A-1D (PRIOR ART) describe prior method and system related to identifying documents that are related to a textual query 150. Specifically, FIG. 1A describes a prior art system 100 for determining a semantic distance between a query 150 and relevant documents searched from an information archive. This is via generating representations for documents and a representation of the query and then based on the representation of the query, identifying documents stored in the information archive that are related to the query. Some aspects of the prior art embodiment 100 were previously disclosed in U.S. Pat. No. 8,548,951 (R. Solmer and W. Ruan). In FIG. 1A, data 110 (documents) are processed to derive their representations and saved in the information archive 135. For a query 150, a representation for the query is also obtained and used to search and select, from the information archive 135, documents that are considered related to the query. The semantic distance between the query and the searched documents is then computed to characterizes the relatedness between the query and the documents.

Specifically, the document representation based Information Archive 135 is populated by document representations that are generated from data 110 (documents). Each input document d in the data 110 is analyzed by a document processor 120 that may determine features from the document. The determined features are then processed by a document representation generator 125 to produce a document representation dD (e.g. a document feature vector). The document representation may then be forwarded from the document representation generator 125 to a document indexer 130 that creates a searchable index based on the document representation and use it to populate the information archive 135. This process is repeated for all documents in the data 110.

Data 110 can be any type of documents, including patents, publications, published patent applications, etc. Features of a document may include textual features or semantic features. Document features (textual or semantic) may include key words, concepts, document style and other features that may characterize a document. The document representation can include both the feature-based vector and semantic based vector and possibly other representations of the content of a document. The information archive 135 is based on a set of documents $d_i$ processed to produce a set of document representations $d_iD$. The information archive 135 may be searched based on indices given a query.

When a Query q 150 is received, it is analyzed by a query processor 160 to extracts features (e.g. query features) that are then processed by a query representation generator 165 to produce a query representation qQ (e.g. a query feature vector). The query representation is then forwarded to a candidate search unit 170 that searches, based on qQ, the information archive 135 to select the documents dDs that are related to query qQ. Such a search may be carried out based on similarities between qQ and the representations of the documents archived in 135. The similarities between the query and the searched documents s(qQ, dD) may then be determined by the semantic similarity calculator 180 and used to determine a document that is closest to the query 150 and its similarity score $s_{max}$(qQ, dD) is passed to the semantic distance calculator 185 which then determines the semantic distance 190 between the query and the most related document. A simplest way to determine the semantic distance 190 is $1-s_{max}$(qQ,dD).

The two representations qQ and dD may by described by semantic vectors which may involve features in spaces of different dimensionalities. For example, prior art U.S. Pat. No. 8,548,951 (R. Solmer and W Ruan) discloses to calculate semantic vectors. All documents are characterized by a 160-dimension vector and other statistical language models via analyzing different parts of the documents. In the case of patents (as documents), the titles, abstracts, full claim sets, as well as the specifications are analyzed to generate semantic vectors. Such vectors are saved and can be retrieved based on a vector of a query in the future. The feature vector associated with a query is generated using a separate algorithm (of the query representation generator 165) and used for searching relevant documents from the information archive 135.

FIG. 1B describes a traditional approach of representing an input document using keywords. As shown, a feature extractor 145 is used to generate a feature-based representation 155 based on one or more input documents 140. A conventional approach is based on a keyword model, that is, the feature based representation 155 is constructed based on keywords extracted from the documents. FIG. 1C describes another traditional approach that characterizes an input document based on semantics of the document. As shown, the feature extractor 145 is used to generate a feature vector, which is passed on to a semantic estimator 175 (e.g., autoencoder) that converts the feature vector into a semantic-based representation 195.

U.S. Pat. No. 8,548,951 discloses unified information representation and applications thereof (R. Solmer and W. Ruan), which describes a query retrieval process wherein a query is processed to generate a feature-based vector that characterizes the query. A unified representation is then created based on the feature-based vector, that integrates semantic and feature based characterizations of the query. Information relevant to the query is then retrieved from an information archive based on the unified representation of the query. FIG. 1D describes the prior art of representing a document using a unified representation 102 that is based on both a feature-based representation 155 and a semantic-based representation 104 of the document.

Such representations may be used to identify relationships between documents and queries and may help users to quickly identify relevant information they are interested in. Such techniques have been applied in different applications, e.g., in prior art searches based on claims contained in a patent application. Further, the relationships identified between prior art and a claim may be further quantified to estimate certain features associated with patents and patent applications. For example, novelty is a requirement for a claim to be patentable. To assess the novelty of a claim, a search for prior art is usually performed against existing databases or public domains. In addition, whether a claim is patentable or not needs also be assessed on non-obviousness in light of the prior art.

U.S. Pat. No. 9,984,066 Method and system of extracting patent features for comparison and to determine similarities, novelty and obviousness (A. Geigel) describes a method for creating computer representations of structural and functional elements in patent documents. The structural and functional representations are used to determine relative closeness of a patent, patent submission or existing product against the previous art in the form of structural and functional elements of other existing patent narratives that conform to a given structure. These functional elements include compound, structures, particular step, material and other things, typically described by noun-phrases. The structures are edges connecting the elements, by the use of words such as verbs, conjunctions, prepositions, etc. By comparing the invention disclosure's structural and functional elements to a chosen sample of existing patents, using a count-based ratio method, Geigel discloses a "novelty score." This approach relies on functional elements and relationships based on nouns and verbs, which then evaluates the distance of the missing nodes and edges using predefined weights in lexicon or semantic repository. Predefined lexicon weights or semantic repositories always have a limit on accurately characterizing new concepts in inventions since word meaning may change in different context or simply over time.

Such representations may differ according to the text processed as well as the specific functional algorithms used. When this occurs, uncertainty may exist as to the reliability of measures such as semantic distance and, hence, any measures that are computed based on the semantic distance. As such, a need exists to develop more robust assessment of semantic distances between a document and a query.

SUMMARY

The teachings disclosed herein relate to methods, systems, and programming for assessing semantic distances. More particularly, the present teaching relates to methods, systems, and programming related to determining semantic distance based on a dynamic norm and applications thereof.

In one example, a method, implemented on a machine having at least one processor, storage, and a communication platform capable of connecting to a network for assessing semantic distance is disclosed. A query is received first. The query is processed by a document representation constructor to obtain a first query representation and by a query representation constructor to obtain a second query representation. A dynamic norm is determined based on the first and second query representations. A plurality of documents are identified based on the second query representation. A semantic distance between the query and the plurality of documents is determined based on the dynamic norm.

In a different example, a system for assessing semantic distance is disclosed, which includes a document representation constructor configured for obtaining a first query representation of a received input query, a query representation constructor configured for obtaining a second query representation of the input query, a dynamic norm determiner configured for determining a dynamic norm based on the first and the second query representations, a relevant document identifier configured for identifying, based on the second query representation, a plurality of documents relevant to the input query, and a semantic distance determiner configured for determining a semantic distance between the input query and the plurality of documents based on the dynamic norm.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for assessing semantic distance, wherein the medium, when read by the machine, causes the machine to perform a series of steps, including, receiving a query, processing the query using a document representation constructor and a query representation constructor, respectively, to correspondingly obtain a first query representation and a second query representation, determining a dynamic norm based on the first and second query representations, identifying a plurality of documents based on the second query representation, and determining a semantic distance between the query and the plurality of documents based on the dynamic norm.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to estimate dynamically adaptable semantic distance measures in the context of identifying relevant documents. Particularly, a semantic distance measure between a query and a document may be computed based on a dynamic norm, wherein the dynamic norm is computed in an adaptive manner. Optionally, a semantic distance between a query and its relevant documents may also be estimated in light of a confidence score that may be obtained based on statistics or metrics derived from semantic similarities between a query and its respective relevant documents. Such a determined semantic distance may be used in different applications, including but not limited to, semantic override in the context of Boolean filtering, computing novelty/non-obviousness scores of a claim with respect to prior art, determining distinction index indicative of patentability of a claim, invention protection management, as well as IP development and confidence assessment.

Figure 1A:
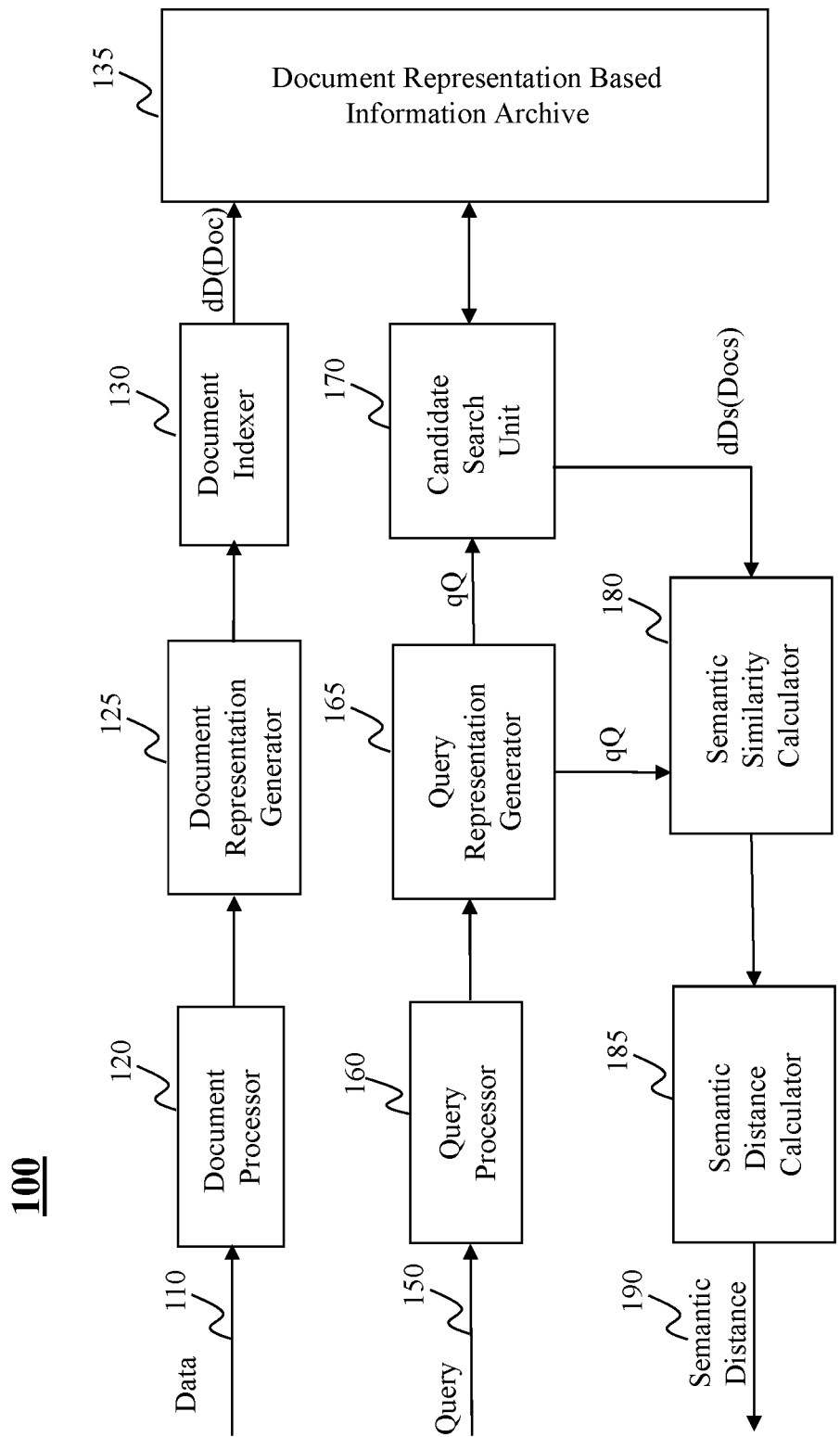
FIG. 1A (PRIOR ART) provides a system diagram of a conventional system for determining semantic distance between a query and a document.
Figure 1B:
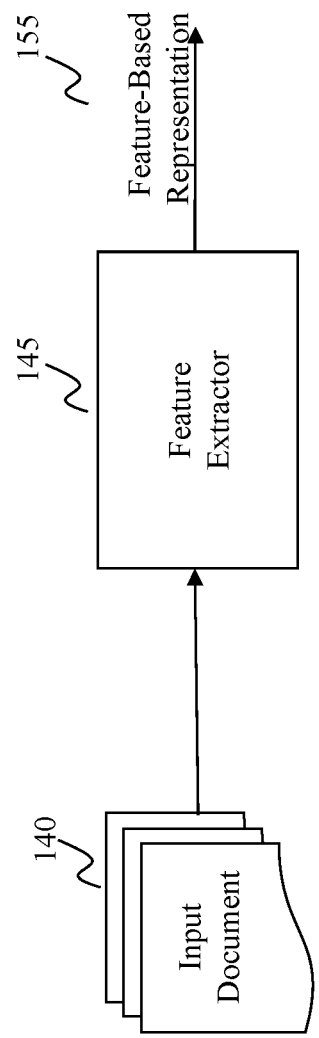
FIG. 1B-1D (PRIOR ART) describe different conventional ways to compute a representation of a document.
Figure 1C:
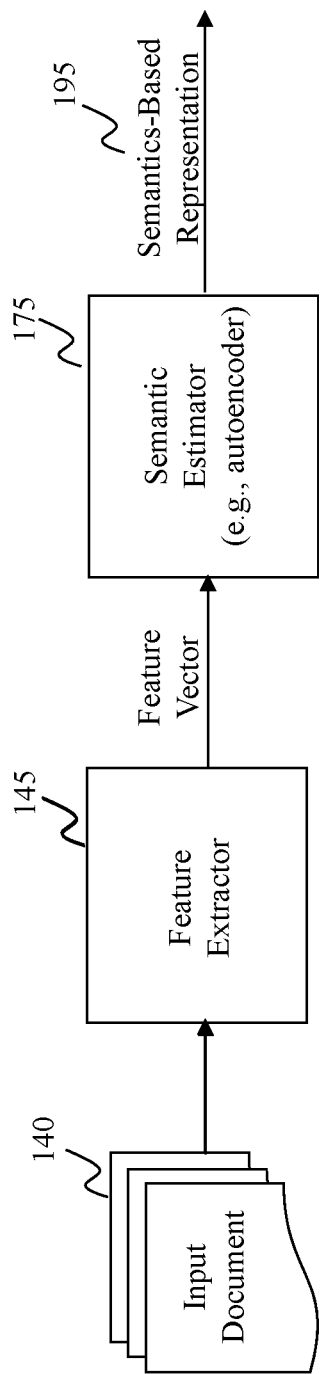
Figure 1D:
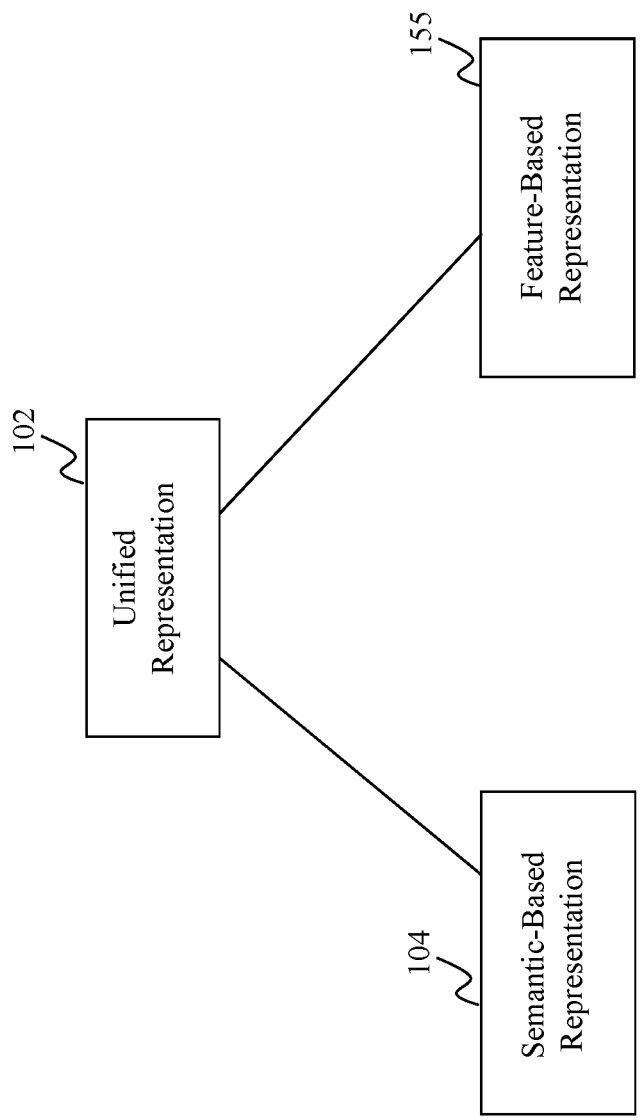
Figure 2A:
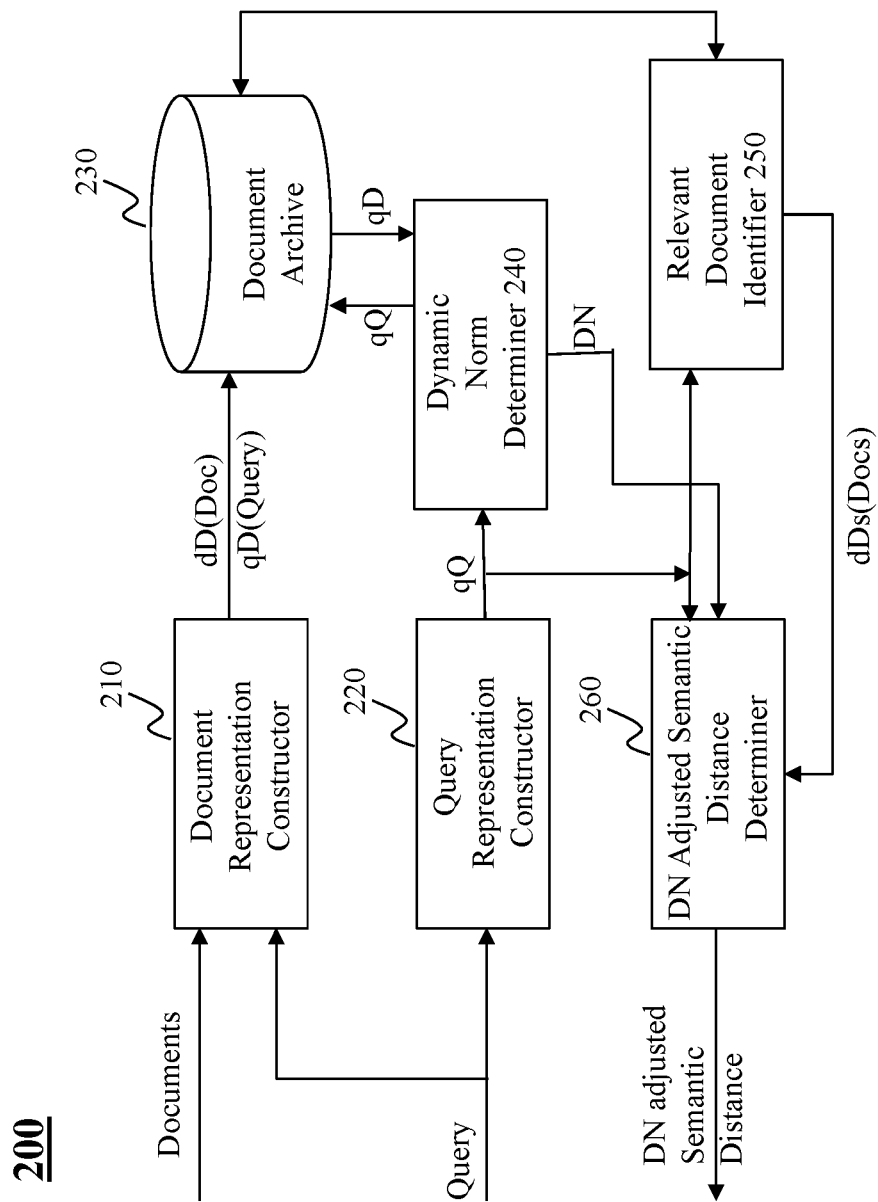
FIG. 2A depicts an exemplary high level system diagram of a system for computing semantic distance between a query and one or more relevant documents, according to an embodiment of the present teaching.

FIG. 2A depicts an exemplary high-level diagram of a system 200 for estimating semantic distance between a query and one or more documents that are related to the query, according to an embodiment of the present teaching. In this exemplary embodiment, the system 200 comprises a document representation constructor 210, a query representation constructor 220, a dynamic norm determiner 240, a relevant document identifier 250, and a dynamic norm adjusted semantic distance determiner or DN adjusted semantic distance determiner 260. The system also includes a document archive 230 that stores various documents in their representations developed in a manner that is suitable for search and retrieval. For such documents, the document representation constructor 210 processes each of the documents and generates its representation dD. Generation of such a representation may be performed in accordance with conventional approaches as discussed with reference to FIGS. 1A-1D, e.g., with feature vectors or semantic vectors and appropriate indices. Such generated document representations are stored in the document archive 230.

When a query is received, the query representation constructor 220 processes it and generates a representation of the query qQ, in the similar manner as what is disclosed with reference to FIGS. 1A-1D. However, in accordance with the present teaching, the query is also sent to the document representation constructor 210, where the query is processed to generate a corresponding representation qD (a query representation generated by the document representation constructor 210) for the query. Such generated query representation is then stored in the document archive 230 so that it can be searched and retrieved. The query representation qQ generated by the query representation constructor 220 may (usually) differ from the query representation qD generated by the document representation constructor 210 and such a difference may be used by the dynamic norm determiner 240 to establish a dynamic norm (DN). In some embodiments, the self-similarity between qQ and qD may be explored to provide adaptivity to the computation of the semantic distance. In some embodiments, qD may not be indexed in the document archive 230, the self-similarity between qQ and qD can be calculated on the fly instead.

It is noted that although both qQ and qD are generated based on the same query, the correlation or similarity between qQ and qD, or S (qQ, qD), can be substantially less than 1.0 (one). This means that the number one used in $1-S_{max}(qQ, dD)$ to compute the semantic distance may not hold accurately because S (qQ, qD)<1.0 and it can be used as a dynamic norm in determining the semantic distance. In some embodiments, semantic distance is computed as:

$$DN \text{ adjusted Semantic Distance} = \text{Absolute Value}(S(qQ,qD) - S_{closest}(qQ,dD)) \quad (1)$$

where DN denotes dynamic norm and $S_{closest}(qQ, dD)$ is the similarity between the query and a document (from the searched documents) that is the most similar to the query. Other ways to compute the dynamic norm adjusted semantic distance may also be used. For example, in some embodiments, $S_{avg}(qQ, dD)$ may also be used, where $S_{avg}(qQ, dD)$ represents the average similarity between the query and the searched documents. Similarly, $S_{median}(qQ, dD)$ may also be used where $S_{median}(qQ, dD)$ represents the median similarity. In some embodiments, such similarity measures (closest, average, median) may be used together in a weighted fashion, while the weight on each may be adaptively determined based on a query confidence score determined based on the distribution pattern of the similarity measures between the query and individual relevant documents. Details related to the query confidence score are provided with reference to FIGS. 3 and 4B.

Specifically, to establish the dynamic norm, when qQ is sent to the dynamic norm determiner 240, it retrieves, from the document archive 230, qD that represents the representation of the query generated by the document representation constructor 210. Based on qQ and qD, the dynamic norm determiner 240 may compute the dynamic norm (DN) and send it to the DN adjusted semantic distance determiner 260 so that the DN adjusted distance measure may be accordingly determined based on the dynamic norm. In some embodiments, similarity between qQ and qD or S(qQ, qD) may be used as the dynamic norm. Other ways to establish the dynamic norm may also be implemented.

In the meantime, the representation qQ for the query is also sent to the relevant document identifier 250, which searches the document archive 230 for documents dDs that are related to qQ. Such searched relevant documents dDs are then sent to the DN adjusted semantic distance determiner 260, which determines the DN adjusted semantic distance between the query and the relevant documents based on qQ, dDs, and the dynamic norm DN. Compared with conventional techniques to compute the semantic distance, the DN adjusted semantic distance is dynamically adapted to each situation and thus more accurately characterizes the substantial difference between the query and the searched documents.

Figure 2B:
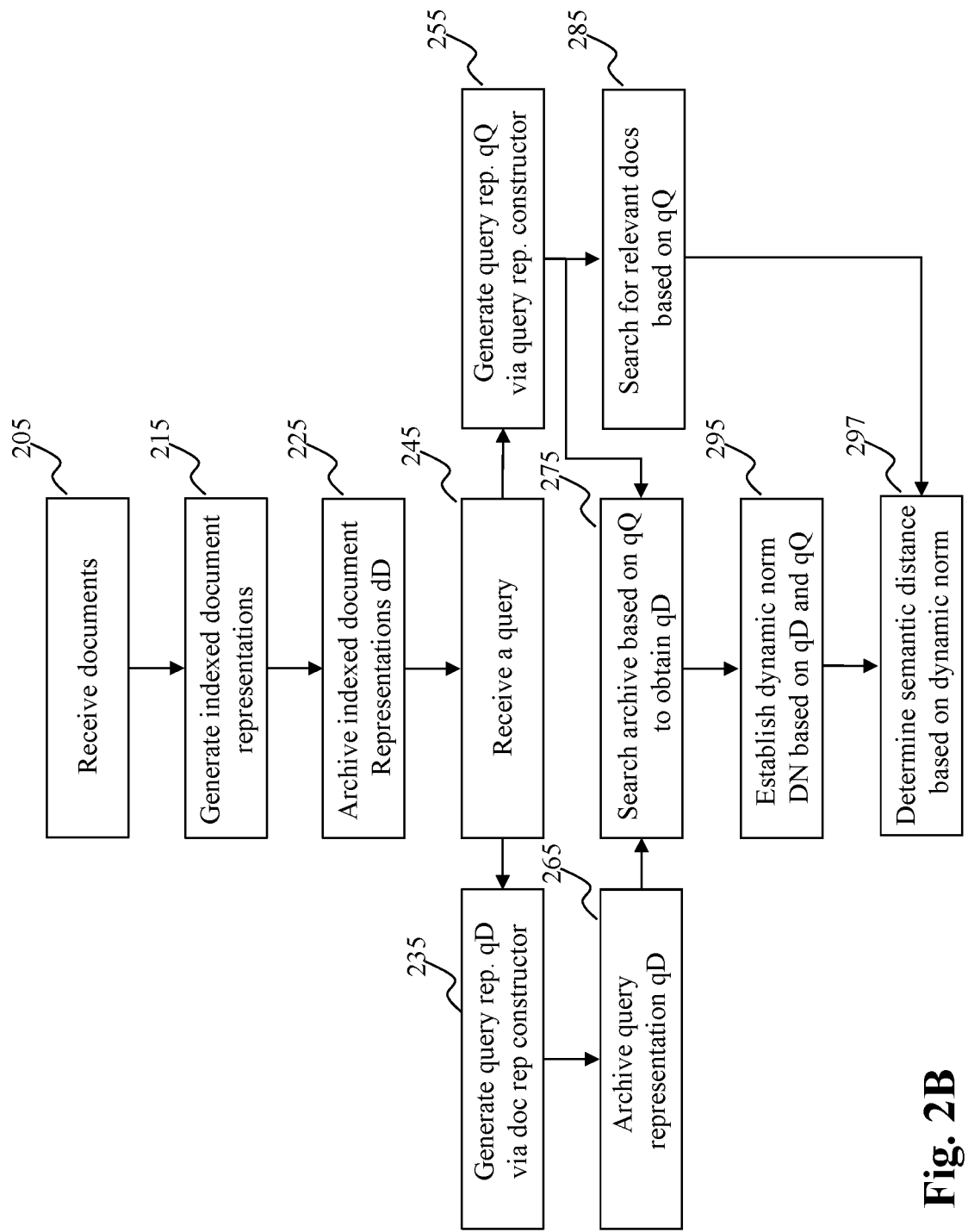
FIG. 2B is a flowchart of an exemplary process for computing semantic distance between a query and one or more relevant documents, according to an embodiment of the present teaching.

FIG. 2B is a flowchart of an exemplary process for computing DN adjusted semantic distance between a query and relevant document(s), according to an embodiment of the present teaching. The process is based on a document archive so that the process starts with establishing the document archive 230, which can be a process that is continuous. When documents are received at 205, the document representation constructor 210 generates, at 215, representations dDs for the documents and then archive, at 225, the indexed dDs in the document archive 230. The documents may be any articles, publications, patents, patent applications, etc. When the document archive 230 is generated, it may be used for search purposes. The search is based on a query, which may be a string of words, a description, a claim directed to an invention to be protected, or a brief disclosure of a product, etc. The query may be used for a search in the document archive 230 to identify documents that are related to, in substance, the content disclosed in the query.

When a query is received at 245, it is sent to both the document representation constructor 210 and the query representation constructor 220. The document representation constructor 210 processes the query like a document and generates, at 235, a representation for the query qD. The query representation qD generated by the document representation constructor 210 is then archived in the document archive 230 in a similar manner as archiving a document representation dD. Such archived qD is also made available for search purposes, as will be disclosed below. The representation qD from the document representation constructor 210 is also sent to the dynamic norm determiner 240 for being used to determine a dynamic norm for identifying relevant documents based on the query.

At the same time, when the query representation constructor 220 receives the query, it processes the query and generates, at 255, a representation for the query qQ. This representation qQ is also sent to the dynamic norm determiner 240 so that it can be used to determine a dynamic norm DN. As disclosed herein, to determine the dynamic norm, the dynamic norm determiner 240 searches, at 275, in the document archive 230 any representations archived that is related to qQ. As qD is generated based on the same query, its representation qD generated by the document representation constructor 210 is identified as a relevant document. In some situations (likely most cases), qD is not identical to qQ and the discrepancy between the two are the basis for the dynamic norm determination.

Upon receiving both qQ and qD, the dynamic norm determiner 240 establishes, at 295, the dynamic norm DN based on the values of qD and qQ. The DN may be computed based on a correlation or similarity between qD and qQ as disclosed herein. In other embodiments, other means to determine the dynamic norm may be used. For instance, a dissimilarity may also be used to reflect the difference between qD and qQ and then used in adjusting the conventional semantic distance by sending such dynamically established DN to the DN adjusted semantic distance determiner 260.

In the meantime, the query representation qQ is sent to the relevant document identifier 250 and is used to search, at 285, documents related to the query. The search relevant documents dDs are sent to the DN adjust semantic distance determiner 260 so that the DN adjusted semantic distance between the query and the dDs may be computed, at 297, based on qQ of the query, the dynamically determined DN (from the dynamic norm determiner 240), and the dDs from the relevant document determiner 250.

Figure 3:
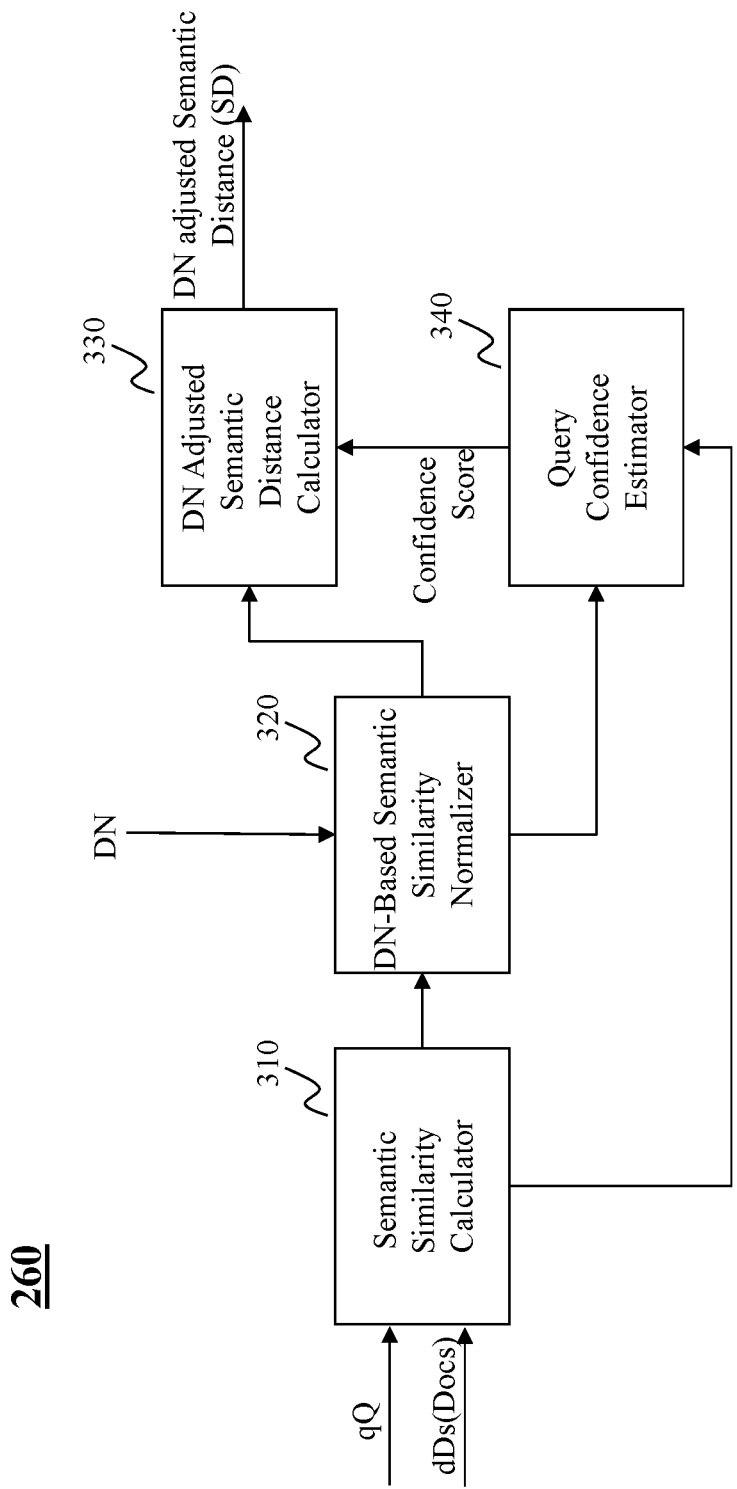
FIG. 3 depicts an exemplary high level diagram of a DN adjusted semantic distance determiner, according to an embodiment of the present teaching.
Figure 4A:
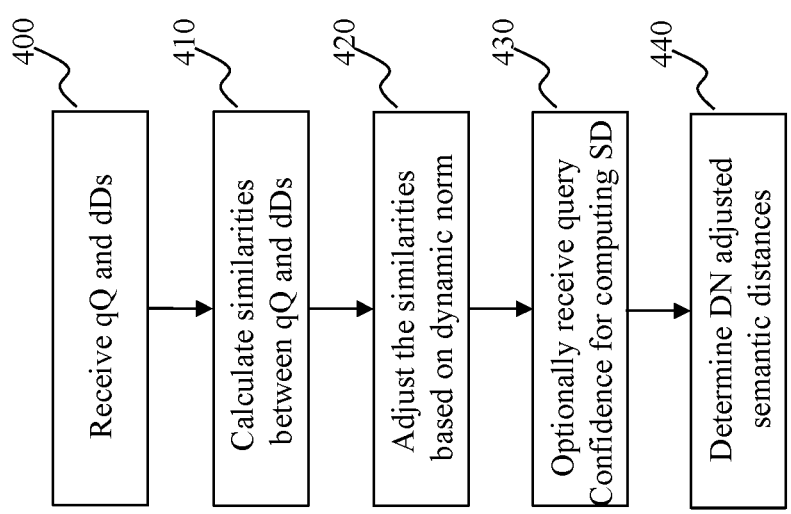
FIG. 4A is a flowchart of an exemplary process for estimating a DN adjusted semantic distance based on a dynamic norm, according to an embodiment of the present teaching.

FIG. 3 depicts an exemplary high-level diagram of the DN adjusted semantic distance determiner 260, according to an embodiment of the present teaching. In this illustrated embodiment, the DN adjusted semantic distance determiner 260 comprises a semantic similarity calculator 310, a DN-based semantic similarity normalizer 320, a DN adjusted semantic distance calculator 330, and optionally a query confidence estimator 340. FIG. 4A is a flowchart of an exemplary process for estimating the DN adjusted semantic distance based on a dynamic norm DN, according to an embodiment of the present teaching. In reference to both FIGS. 4A and 4B, in operation, when the semantic similarity calculator 310 receives, at 400, the representation qQ of the query and the representations dDs of the searched relevant documents, it calculates, at 410, the similarities between qQ and each of dDs. Such similarities are then adjusted, at 420, by the DN-based semantic similarity normalizer 320 based on the dynamically determined DN. The DN adjusted similarities of relevant documents are then sent to the DN adjusted semantic distance calculator 330, which then determines, at 440, the DN adjusted semantic distance.

The computation of the DN adjusted semantic distance may be based on equation (1) as disclosed herein. That is, DN adjusted Semantic Distance=Absolute Value (S(qQ, qD)−$S_{closest}$(qQ, dD)). Other ways may also be used to determine the DN adjusted semantic distance. In some embodiments, which means to be used to determine the value of the DN adjusted semantic distance may be determined dynamically based on the situation. In FIG. 4A, there is optionally a query confidence estimator 340, which assess the confidence of the search result (relevant documents) based on the similarities between the query qQ and the searched documents. In some embodiments, the confidence is based on the distribution pattern of the similarities. For instance, when all similarity scores are close in their values, the distribution pattern formed via a ranked list of scores (e.g., from largest to smallest) may exhibit a shape like a flat line with small slope. When the ranked list of similarity scores exhibit a large range in their values, the distribution pattern may appear to be a slanted line with a large Slope. Such distribution characteristics may be utilized to assess the situation in order to determine a manner by which the DN adjusted semantic distance is to be computed. In one example, when the pattern corresponds to a relative flat line with small slope an average of the similarities may be used to compute the DN adjusted semantic distance, i.e., DN adjusted Semantic Distance=Absolute Value (S(qQ, qD)−

$S_{avg}(qQ, dD))$. On the other hand, if the distribution pattern of the similarity scores corresponds to a slanted line with a large slope, the closest score may be used in computing the DN adjusted semantic distance, i.e., DN adjusted Semantic Distance=Absolute Value $(S(qQ, qD)-S_{closest}(qQ, dD))$.

Figure 4B:
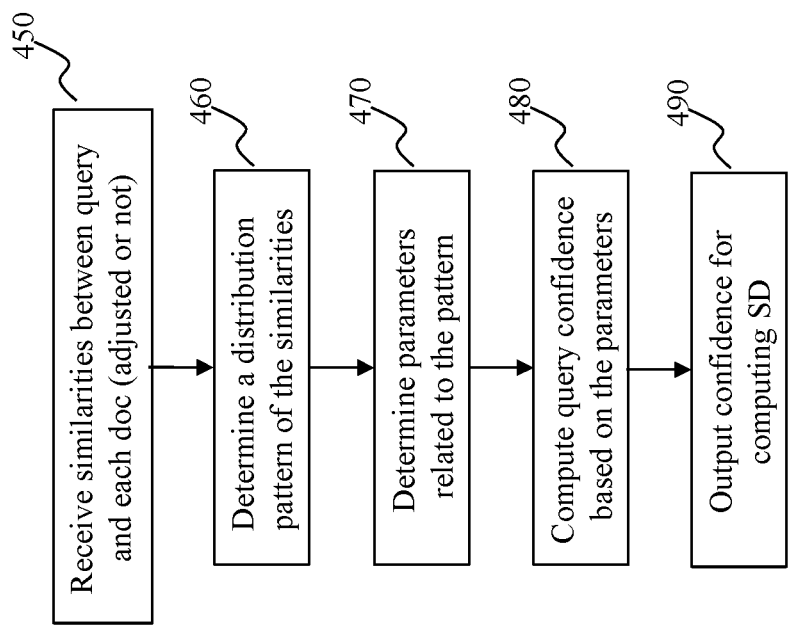
FIG. 4B is a flowchart of an exemplary process for estimating a confidence score associated with a query, according to an embodiment of the present teaching.

FIG. 4B is a flowchart of an exemplary process for computing the confidence score, according to an embodiment of the present teaching. Semantic similarities are first received, at 450, from the semantic similarity calculator 310 and are used to determine, at 460, a distribution pattern. Parameters associated with the distribution pattern (e.g., slope, inflection point, etc.) may then be determined, at 470, based on the pattern. The confidence score is then computed, at 480, based on the parameters related to the distribution pattern and such computed confidence score is then sent, at 490, to the DN adjusted semantic distance calculator 330 for determining the way to compute the DN adjusted semantic distance. For instance, the confidence score may be computed based on certain metrics or parameters associated with the curve representing the distribution pattern of the similarity scores.

It is assumed that the confidence score is associated with the query or is indicative of a level of distinction (or distance) between the query (e.g., a claim or a description of an invention) and the searched relevant documents. In this case, both the shape and the peak of the curve may be indicative of the confidence in the query. For example, if the curve representing the distribution pattern of similarity scores has both a low peak similarity score and a big slope, the confidence score may be relatively high.

As disclosed herein, the confidence score may be computed based on some metric(s) related to the distribution curve of the similarity scores. In one example, tangent values along a similarity distribution curve may be estimated and used as a basis of computing the confidence score. In this example, the confidence score may be a function of the tangent values along the distribution curve. In another example, a tangent line formed by the tangent values of the distribution curve of the similarity scores may be constructed and the tangent of this tangent line may also be used to determine the confidence score. For example, the confidence score may be a function of the tangent of this tangent line.

Figure 5:
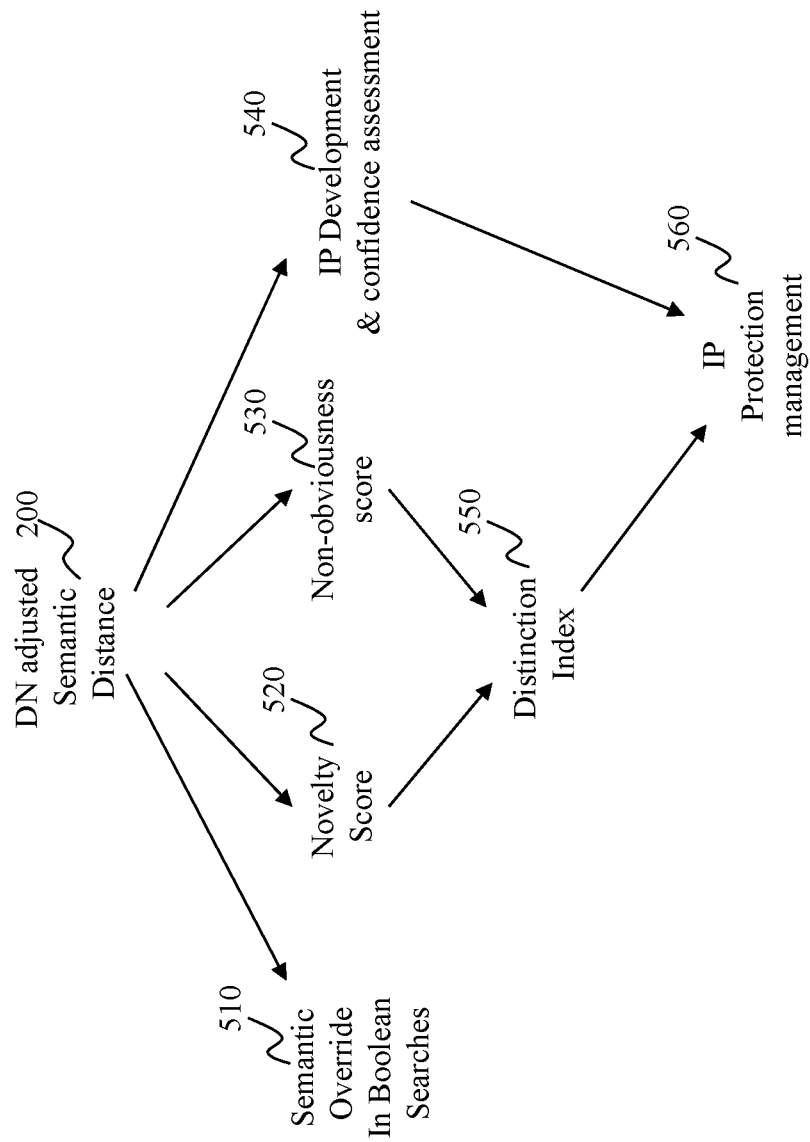
FIG. 5 shows exemplary applications of semantic distance measures, according to an embodiment of the present teaching.

In determining the semantic distance in accordance with the confidence score, the manner by which the semantic distance may be computed may dynamically depend on the confidence score. For example, if the confidence score is high, the peak similarity score may be used to determine the DN adjusted semantic distance. If the confidence score is not high, other means, such as average or median of the similarity scores may be used to compute the DN adjusted semantic distance. FIG. 5 shows exemplary applications of DN adjusted semantic distance measures, according to an embodiment of the present teaching. In this illustrated embodiment, applications related to patent protection are disclosed. As understood, the applications of DN adjusted semantic distances are not limited to the illustrated embodiments. Any application that needs to utilize a measure that measures similarities among documents may use DN adjusted semantic distance measures. In this illustration, DN adjusted semantic distance 200 may be used for applying semantic override 510 in the content of searching for related documents such as prior art using Boolean filters. Details related to semantic override are provided with reference to FIGS. 6A and 6B.

Based on the DN adjusted semantic distance, in assessing the patentability of a query (e.g., a claim or a description of a technology that needs to be protected as a patent), novelty score (520) and/or non-obviousness score (530) may be computed based on the DN adjusted semantic distance and such scores may then be used to estimate a distinction index (550), representative of an assessment of patentability in terms of novelty and non-obviousness. Details on determining novelty/non-obviousness scores as well as the distinction index are provided with reference to FIGS. 8A-8B. The DN adjusted semantic distance measures may also be used by a corporation in its IP development and confidence assessment (540). For instance, any invention disclosure submission within a corporation may be assessed in terms of whether the invention is too close to the prior art based on DN adjusted semantic distance of the invention and whether a design around is needed. Details are provided with reference to FIG. 7. The corporation's IP protection management (560) may also apply the disclosed DN adjusted semantic distance in its management for IP protection. For example, based on the distinction index of an invention, it may be assessed whether it should be protected as a trade secret or a patent. If a patent application is to be filed, whether it should be used for the purpose of defensive publication or not. If a patent is being pursued, during prosecution, situation (cited prior art, amended claims) may change and may be monitored to adaptively employ certain IP protection strategies. Details are provided with reference to FIG. 9.

Figure 6A:
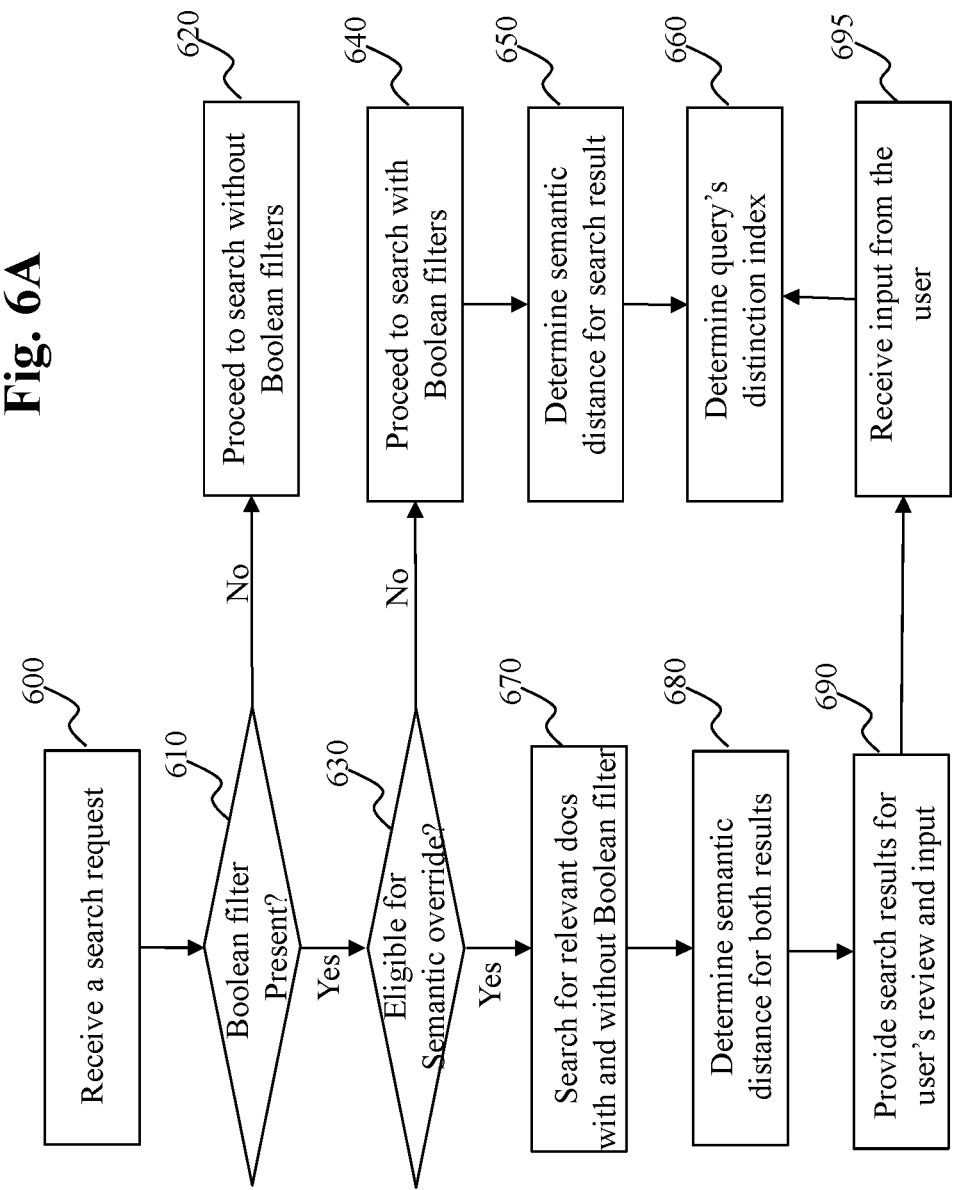
FIG. 6A is a flowchart of an exemplary process for semantic override of Boolean filtering based on semantic distance measures, according to an embodiment of the present teaching.

FIG. 6A is a flowchart of an exemplary process for semantic override of Boolean filtering based on DN adjusted semantic distance, according to an embodiment of the present teaching. Semantic override refers to using a semantic distance on top of a search result from a Boolean filter so that if the semantic distance meets a certain criterion (e.g., the semantic distance is too large), the search result will be removed from the search result, or vice versa, if the semantic distance meets a certain criterion (e.g., the semantic distance is small) but the search result is filtered out by the Boolean filter, the search result will be added back. That is, although the Boolean filter retains the search result, the test via the semantic distance overrides that decision by removing it from or adding it back to the search result. To achieve that, either a conventional semantic distance or the disclosed DN adjusted semantic distance may be used. In operation, when a search request is received at 600, it is checked, at 610, whether a Boolean filter is present. If no Boolean filter is present, the search proceeds to search, at 620, without Boolean filters.

If a Boolean filter is present in the search request, it is further checked, at 630, whether any Boolean filter can be applied in conjunction with semantic override. In many searches, Boolean filters are applied. Examples include Boolean filters based on classification code (specific codes or ranges), assignee, text in, e.g., title/claim/abstract/description/body text (NPL), proximity operators, word stemming and/or wildcards. Such Boolean filtering excludes any non-matching results from the search result. Depending on the nature of Boolean filters, some may or may not be used in conjunction with semantic override. For instance, Boolean filters used in prior art searches based on dates (e.g., earliest priority date, filing date, and/or publication date) may not be overridden, while Boolean filters based on text may be overridden.

If none of the Boolean filters can be applied in conjunction with semantic override, the search proceeds to 640 to conduct the search with application of Boolean filters. In case of searching for prior art, such searched result may then be used to determine, at 650, semantic distance which may in turn be used to compute, at 660, the distinction index of the query in light of the searched prior art. If any Boolean filter is eligible for semantic override, determined at 630, the process proceeds to search, at 670, for relevant documents with and without Boolean filters. Then semantic override is applied to both search results at 680. The search results with their respective semantic distance scores are then provided, at 690, to a user, e.g., who requested the search, for review and for input as to which search result is to be adopted. When the user specify which search result is to be used, at 695, the semantic distance of the selected search result is used to determine, at 695, the distinction index of the query.

Figure 6B:
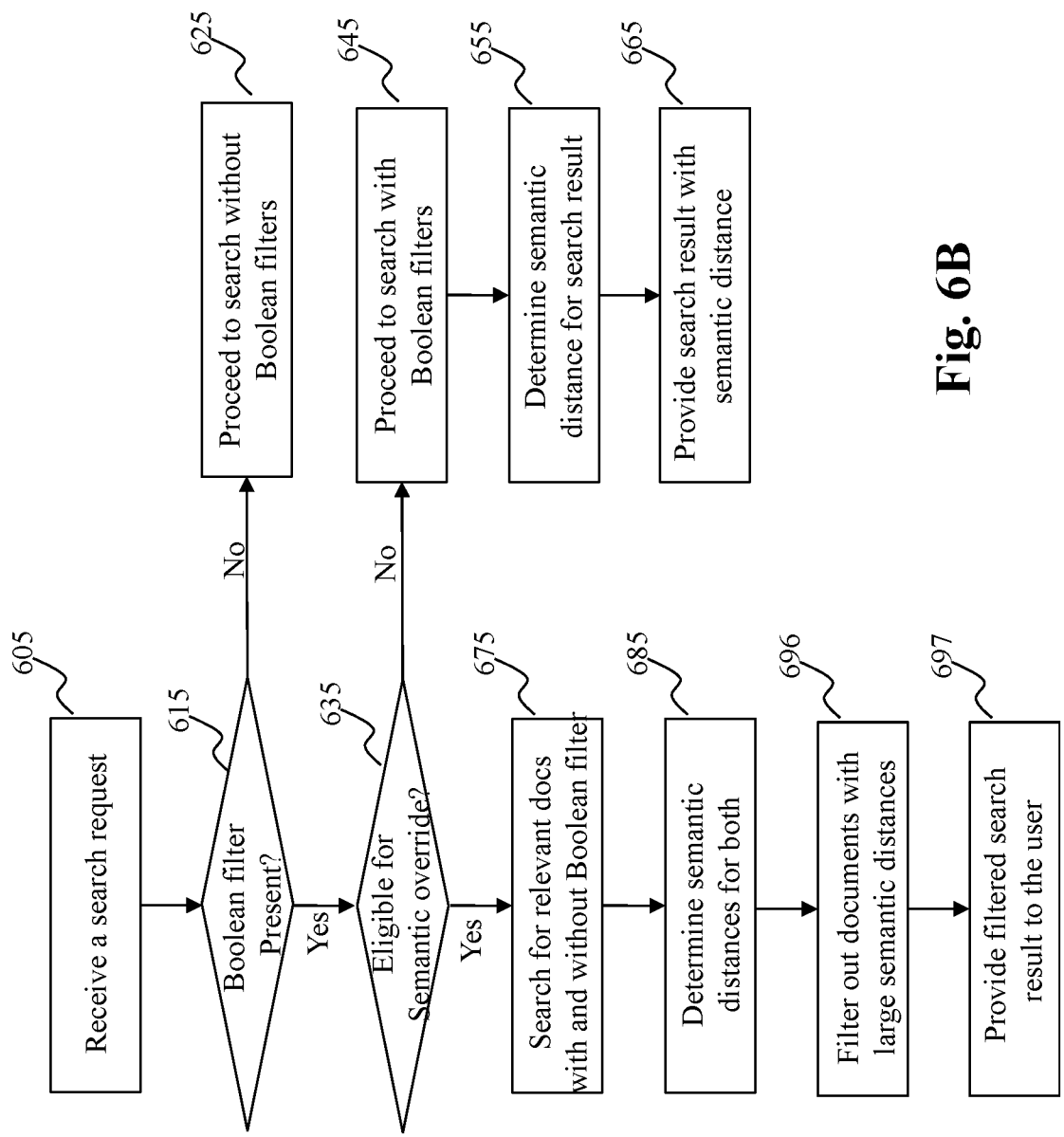
FIG. 6B is a flowchart of an exemplary process for semantic override of Boolean filtering based on semantic distance measures, according to a different embodiment of the present teaching.

FIG. 6B is a flowchart of an exemplary process for semantic override of Boolean filtering based on semantic distance, according to a different embodiment of the present teaching. To achieve that, either a conventional semantic distance or the disclosed DN adjusted semantic distance may be used. In operation, when a search request is received at 605, it is checked, at 615, whether a Boolean filter is present. If no Boolean filter is present, the search proceeds to search, at 625, without Boolean filters. If a Boolean filter is present in the search request, it is further checked, at 635, whether any Boolean filter can be applied in conjunction with semantic override. If none of the Boolean filters can be applied in conjunction with semantic override, the search proceeds to 645 to conduct the search with application of Boolean filters. In case of searching for prior art, such searched result may then be used to determine, at 655, semantic distance between the query and the search result. In this embodiment, the search result and the corresponding semantic distance are then provided to the user at 665.

If any Boolean filter is eligible for semantic override, determined at 635, the process proceeds to search, at 675, for relevant documents with and without Boolean filters. For both search results (with and without the Boolean filters), DN adjusted semantic distances are computed, at 685, respectively, and used to filter out, at 696, documents whose semantic distances may meet a certain criterion (e.g., exceeds a certain value). The filtered search results are then provided to the user at 697.

Figure 7:
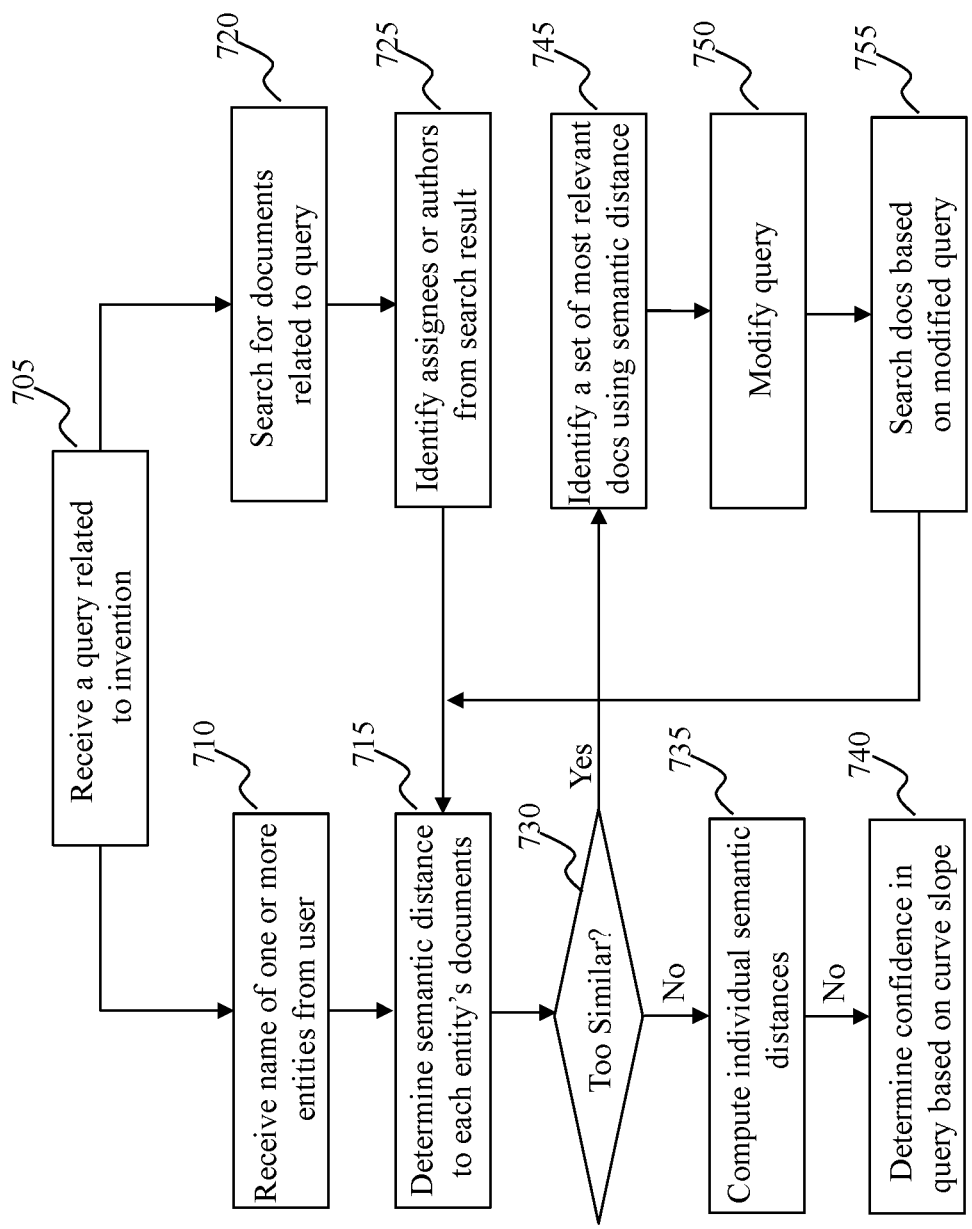
FIG. 7 is a flowchart of an exemplary process of IP development and confidence assessment based on semantic distance measures, according to an embodiment of the present teaching.

FIG. 7 is a flowchart of an exemplary process of IP development and confidence assessment based on semantic distance measures, according to an embodiment of the present teaching. As disclosed herein, this process may correspond to the IP development process within a corporation which utilizes the concept of semantic distance to assess inventions emerged. In operation, when a query related to an invention (e.g., a description of the invention or invention disclosure) is received at 705, there may be multiple tracks of activities to identify whether someone else have developed similar technologies. Along a first track, names of other entities (e.g., competitors) may be provided and received, at 710, from a user and then used to search the named entities' documents that are related to the query and semantic distance to each of such identified documents are determined at 715. Along a different track, documents related to the query may be searched, at 720, based on the query. From such searched documents, assignees or entities the authors belong are identified at 725 and the searched documents are used to determine, at 715, the semantic distance to the documents of each of the entities.

Semantic distance used may be conventional semantic distance or the disclosed DN adjusted semantic distance. When the semantic distance between the query and the searched documents indicates that the query is too close to the searched documents, determined at 730, design around effort may be initiated. Specifically, a set of documents that are most relevant to the query are identified at 745 and are used to guide to modify, at 750, the query. The modified query is then used to conduct a renewed search at 755 and the renewed search result is then used to determine, at 715, the renewed semantic distance between the modified query and the renewed search result. This process may continue until a modified query is no longer too similar to the corresponding renewed search result, determined at 730. For a query (either original or modified) that is reasonable distinct from the search prior art, the semantic distance is computed at 735 and then used in determining, at 740, the confidence in the query as to the distinctiveness. In some embodiment, the confidence in the query is determined based on, e.g., some parameters derived from the distribution pattern of the semantic similarities in accordance with the disclosure with reference to FIG. 4B. Such estimated confidence in the query (invention) may be used for the corporation to determine a protection plan for the invention or whether to invest the capital to seek patent protection.

Figure 8A:
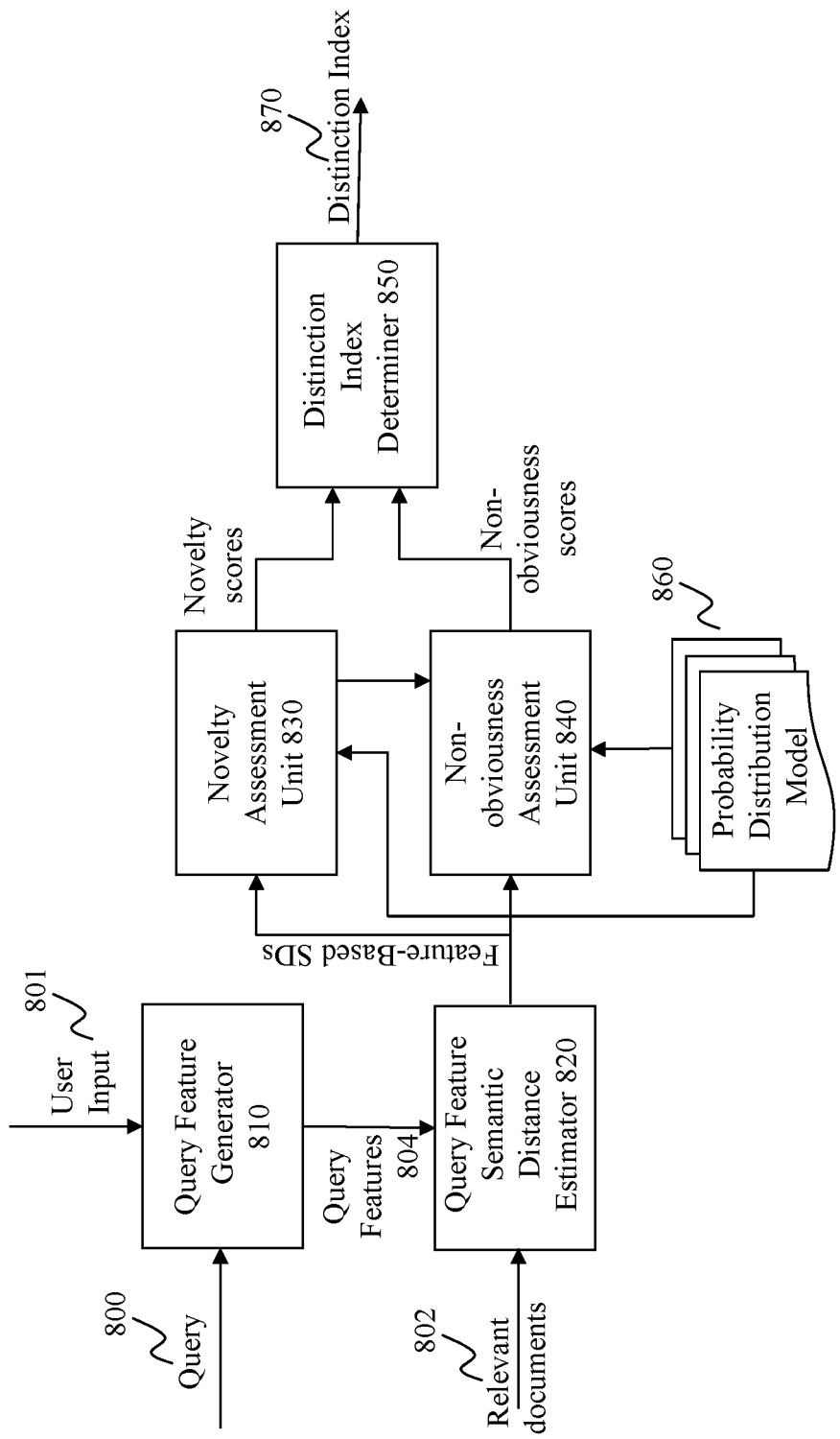
FIG. 8A depicts an exemplary high level system diagram for estimating a distinction index based on semantic distance measures, according to an embodiment of the present teaching.
Figure 8B:
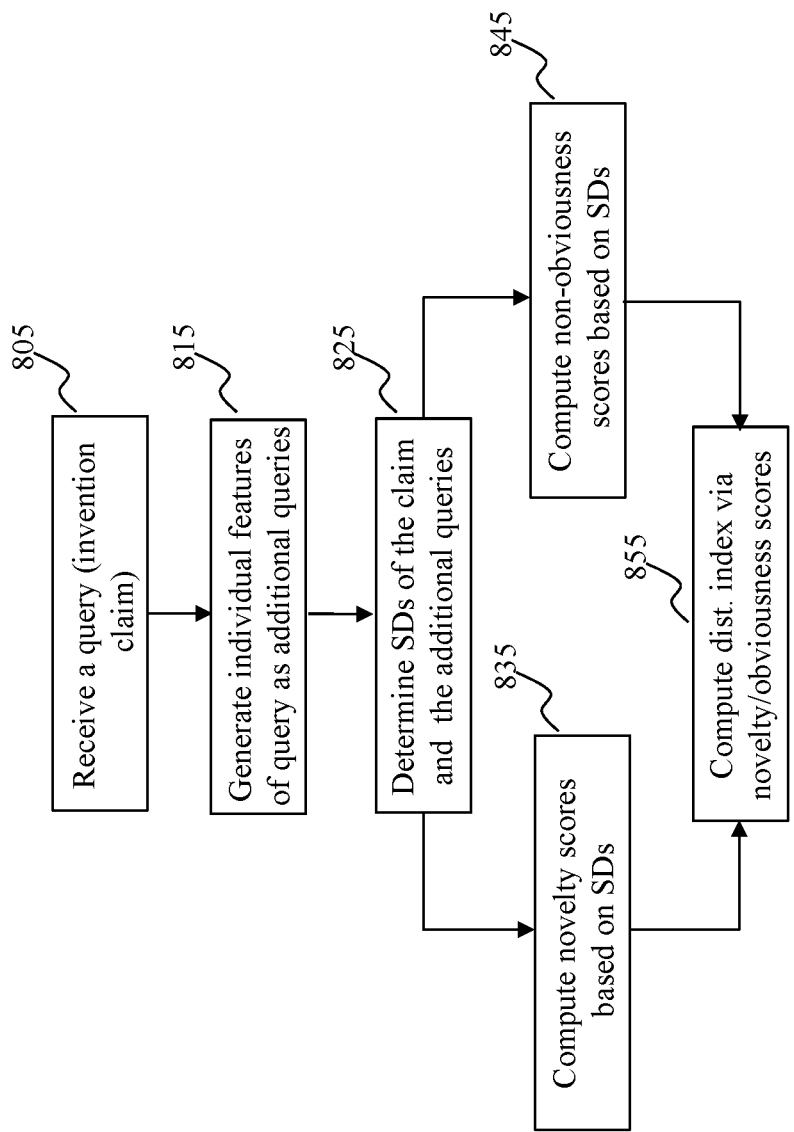
FIG. 8B is a flowchart of an exemplary process for estimating a distinction index based on semantic distance measures, according to an embodiment of the present teaching.

As discussed with respect to FIG. 5, semantic distance (including both original and DN adjusted) may be utilized to determine scores related to different aspects of patentability in order to assess how distinct a query (invention description) is. FIG. 8A depicts an exemplary high-level system diagram for estimating a distinction index via novelty/non-obviousness scores based on semantic distance, according to an embodiment of the present teaching. To obtain distinction index, the exemplary embodiment of the system comprises a query feature generator 810, a query feature semantic distance estimator 820, a novelty assessment unit 830, a non-obviousness assessment unit 840, and a distinction index determiner 850. FIG. 8B is a flowchart of an exemplary process for estimating a distinction index based on semantic distance, according to an embodiment of the present teaching. FIG. 8B is a series of steps performed by different components in FIG. 8A.

In the illustrated embodiment, a query 800 and its relevant documents 802 serve as input. The output 870 is a distinction index. The query may correspond to a claim or a description of an invention. The query 800 may include different inventive features. In some embodiments, a base query 800 may be split into different query features 804 based on a user input 801 identifying different aspects of the invention. In some cases, such aspects may correspond to different parts of the query. For instance, when a query is a claim set, each claim may be split into different query features, e.g., on a per claim or per claimed limitation basis. Such identified aspects of the invention or query features of the original query may be treated as individual queries associated with the original query. To compute the distinction index 870, novelty score 520 and non-obviousness scores 530 for the query 800 are first determined based on semantic distances between the query and query features (split from the original query) and the relevant documents. Such computed novelty and non-obviousness scores are then used to determine the distinction index 870.

In operation, when the query 800 is received at 805 in FIG. 8B, individual query features 804 are generated by the query feature generator 810, at 815, based on the user input 801. The individual query features are then used as additional queries to determine, at 825 by the query feature semantic distance estimator 820, a semantic distance of each query feature with respect to the relevant documents 802. The semantic distance for each query (or query feature) may be a conventional semantic distance or the disclosed DN adjusted semantic distance. The semantic distances, for both the original query 800 and the individual query features 804, are then used by the novelty assessment unit 830, at 835, to compute the novelty score for each query feature as well as the original query. In addition, the semantic distances associated with the original query and the query features are used by the non-obviousness assessment unit 840, at 845, to compute the non-obviousness scores. The computed novelty and non-obviousness scores are then used by the distinction index determiner 850, at 855, to determine a distinction index of the query 800 given the relevant documents 802.

In some embodiments, the novelty assessment unit 830 may assess whether the novelty scores computed for the query and its features satisfy a certain condition in order for activating the computation of the non-obviousness score. For example, it may be determined that only if certain criterion is met, the non-obviousness score will be computed. For instance, if none of the novelty scores for query and its features exceed a certain threshold, the novelty assessment unit 830 may activate the non-obviousness assessment unit 840 to proceed to assess the non-obviousness of the query.

In some embodiment, the overall novelty may be assessed based on a combination of the novelty scores for individual query features. For instance, a mean or average, a weighted average (with weight to key inventive feature(s)) may be used to assess the novelty. When the user provides the user input 801 to split the query into query features, weights may also be specified as to the weight with respect to each of the query features. Then such weights may be applied to their corresponding novelty scores and combined (mean, median, weight average, etc.) to derive an overall novelty score. In some embodiments, exceptional novelty scores may also be identified based on the overall novelty score. For instance, if there is a query feature that has a novelty score much higher than the average novelty score, then it is considered as an exceptionally novel query feature. On the other hand, when all novelty scores are at about the same level as the average one which is not high enough to retain novelty for patentability purposes, the overall novelty may also be problematic. That is, the distribution of the novelty scores may serve the purpose of assess the novelty.

The computed novelty scores may influence how the non-obviousness scores are computed. As discussed herein, the novelty scores may be used to determine whether to trigger the computation of the non-obviousness scores. For instance, when the novelty scores are high, it may moot the need to compute the non-obviousness scored. If only a few query features have reasonable novelty scores with a relatively low overall novelty score, it may be a reason to further assess the non-obviousness by computing the scores for non-obviousness.

In one embodiment, features likely to be found together based on user judgement may be substituted or augmented with automatic clustering, e.g., k-means clustering and hierarchical clustering, or other machine learning techniques, e.g., latent semantic analysis and principle component analysis. Thereafter, certain rules can be applied (e.g., if one broken out group novelty scores high) then the novelty and/or non-obvious assessment may be high even if the core invention is still identified as "not novel" or "unlikely to be novel". If the separate novelty scores for query features are all clustered together and are below a certain threshold, the invention may be considered more likely to be "obvious". Thresholds can be based on a probability distribution model obtained based on result set or a fixed cut-off, e.g., relevancy score that differs by more than 0.2.

Figure 9:
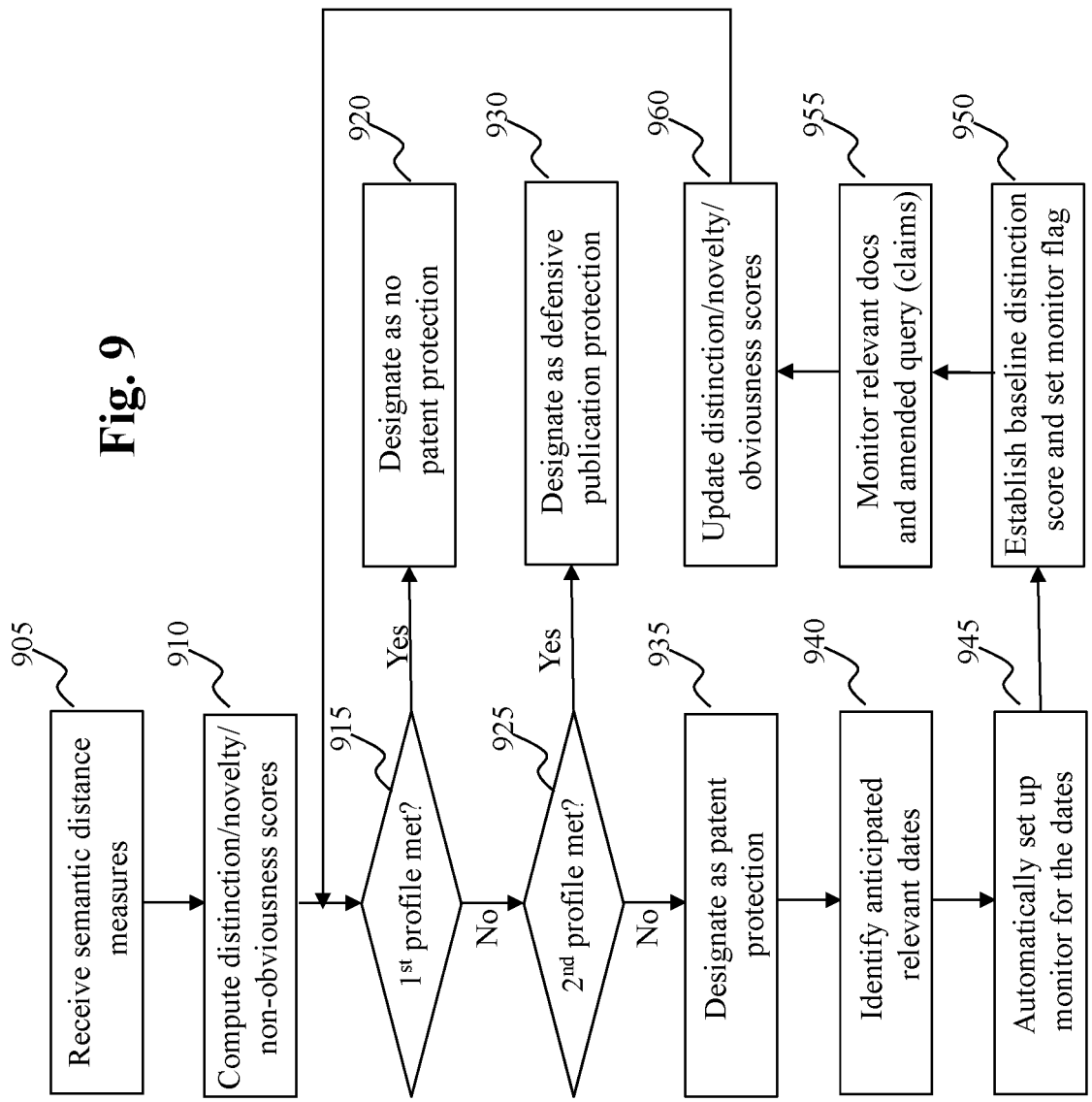
FIG. 9 is a flowchart of an exemplary process of using semantic distance measures in IP protection management, according to an embodiment of the present teaching.

The computed novelty scores, non-obvious scores, and distinction index may be further integrated with or utilized in intellectual property protection management. For example, such assessment scores may be used by a corporation's IP management to assist to make determinations as to whether an invention should be protected as a trade secret, a patent, or merely defensively publishing it. FIG. 9 is a flowchart of an exemplary process of using distinction related scores computed based on semantic distance measures in IP protection management, according to an embodiment of the present teaching. When semantic distances are received at 905, distinction index is determined based on novelty/non-obviousness scores, as shown in FIG. 5. In using such measures in IP protection management, various criteria or decision profiles related to IP protection management may be pre-determined and used in assessing different ways to protect IP based on the novelty/non-obviousness scores and the distinction index. For instance, a corporation may specify that when such scores meet a first decision profile, which may provide different criteria therein with each directed to a particular score or index (e.g., novelty score threshold, non-obviousness score threshold, and distinction index threshold), a first protection mode (e.g., protect as know-how or trade secret) for the invention is to be adopted. When the scores meet a second decision profile, a second protection mode (protecting by defensive publication) may be adopted. For example, defensive publication is not necessary when existing prior art is identical, and understanding the differences when it's close can enable a more effective defensive publication for a "picket-fence" IP strategy of ensuring freedom to operate by a combination of patents and defensive publication. Furthermore, when the scores meet a third decision profile, a third protection mode (protecting as a patent) may be adopted.

In some embodiments, the system may be designed to notify designated legal representative(s), such as in-house or outside counsel, or an invention review committee to confirm a decision on protection mode recommended by the system. In addition, various management functions may also be developed that monitors the status (office actions, cited prior art references, amendment proposed to respond to office actions, allowances, continuation applications, divisional patent applications, etc.) of the prosecution of patent applications and adjusts the protection strategy dynamically. Furthermore, important dates related to the adopted protection mode may also accordingly set up and be monitored. For instance, if an invention is deemed for patent protection, different bar dates related to patenting may be automatically set up and observed.

Referring back to FIG. 9, when novelty/non-obviousness scores and distinction index are determined, it is assessed, at 915, whether the scores/measures meet the first decision profile. If the first decision profile is met, the system designates, at 920, that the invention will not be protected as a patent, e.g., be protected as know-how or trade secret. If the first decision profile is not met, it is further checked at 925 as to whether the scores/measures meet the second decision profile. If the scores/measures meet the second decision profile, the invention may be designated, at 930, to be protected via defensive publication at 930.

If none of the first and second decision profiles is met, the system may designate, at 935, the invention to be protected as a patent. As such, various relevant dates may be automatically set at 940 and appropriate monitoring mechanism at 945. The assessment result based on which the protection decision is made may then be used to establish, at 950, the baseline indications such as expected novelty, non-obviousness, and distinction over the known prior art. Once these are set up, the system will automatically observe the dates set and execute the protection plan. During the prosecution, the system may then continue to monitor, at 955, new emerged relevant documents (e.g., cited prior art) as well as amendments made to the claims. Based on the emerged prior art and amendment to the claims, the system may then modify or update, at 960, novelty/non-obviousness scores and the corresponding distinction index by re-computing them based on the newly obtained information. Such newly obtained novelty/non-obviousness scores and distinction index are then used to re-assess the protection strategy, starting from 915.

Figure 10:
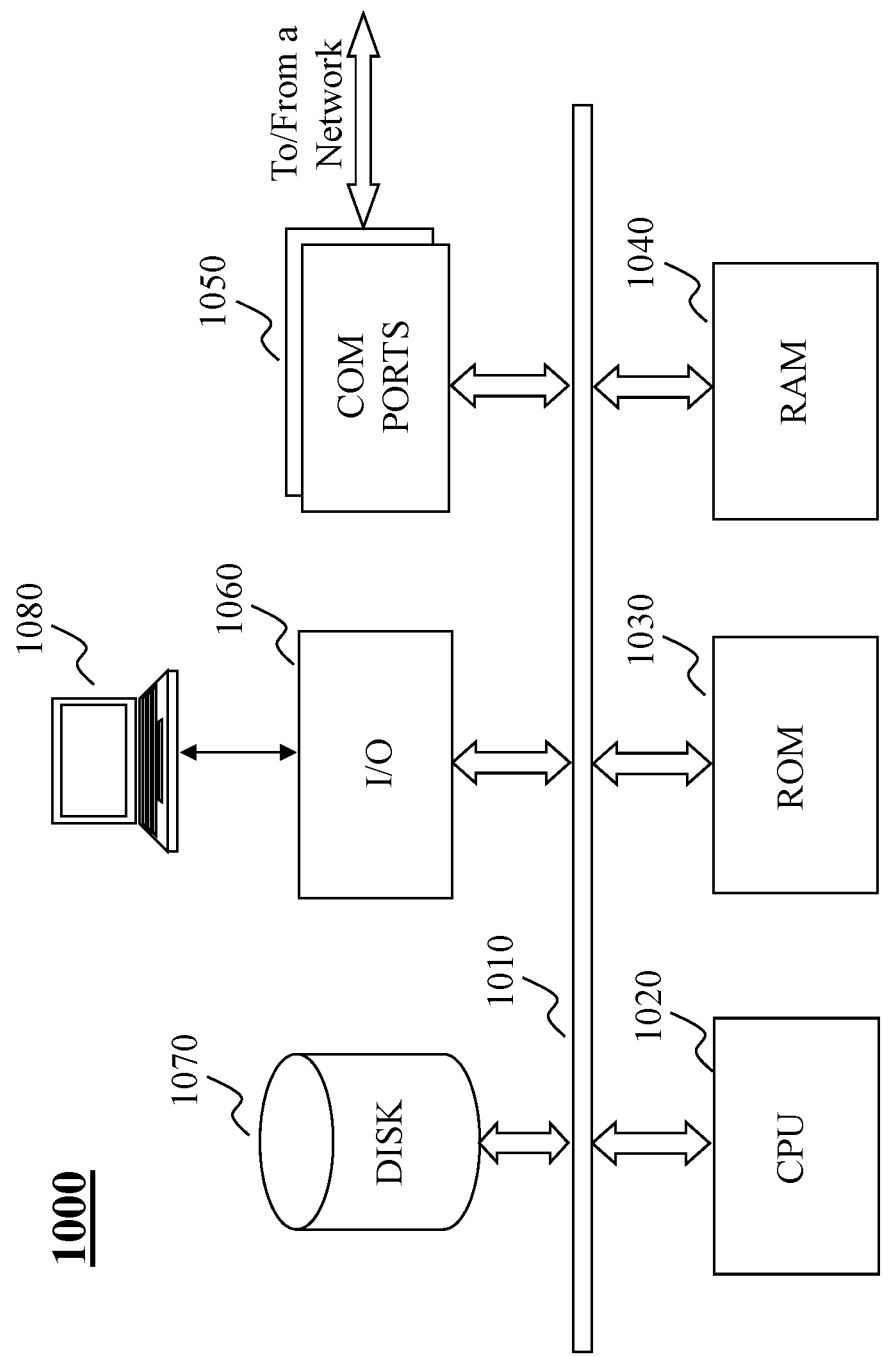
FIG. 10 depicts the architecture of a computer which can be used to implement a specialized system incorporating the present teaching.

FIG. 10 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1000 may be used to implement any component of the present teaching, as described herein. For example, the present teaching may be implemented on a computer such as computer 1000, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 1000, for example, includes COM ports 1050 connected to and from a network connected thereto to facilitate data communications. The computer 1000 also includes a central processing unit (CPU) 1020, in the form of one or more processors, for executing program instructions. The exemplary computer platform includes an internal communication bus 1010, program storage and data storage of different forms, e.g., disk 1070, read only memory (ROM) 1030, or random access memory (RAM) 1040, for various data files to be processed and/or communicated by the computer, as well as possibly program instructions to be executed by the CPU. The computer 1000 also includes an I/O component 1060, supporting input/output flows between the computer and other components therein such as user interface elements 1080. The computer 1000 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform for assessing semantic distance, comprising:
   receiving, via the communication platform, a query;
   obtaining, via a document representation constructor, a first query representation of the query capturing characteristics of the query;

obtaining, via a query representation constructor, a second query representation of the query capturing the characteristics of the query;
determining, via a dynamic norm determiner, a dynamic norm based on a discrepancy between the first and the second query representations, wherein the dynamic norm is indicative of a bias between the document and query representation constructors;
identifying a plurality of documents relevant to the query based on the second query representation; and
for each of the plurality of documents,
computing a similarity between the document represented by a document representation obtained via the document representation constructor and the query represented by the second query representation obtained via the query representation constructor, and
determining a semantic distance between the query and the document based on the dynamic norm and the similarity, wherein the semantic distance is derived by adjusting a distance between the query and the document based on the dynamic norm to address the bias.

2. The method of claim 1, wherein the determining the dynamic norm comprises:
computing a similarity between the first and the second query representations; and
determining the dynamic norm based on the similarity.

3. The method of claim 1, wherein the step of the determining the semantic distance comprises:
computing a similarity between the query and each of the plurality of relevant documents;
determining a statistic based on the similarities between the query and the plurality of relevant documents; and
obtaining the semantic distance based on the statistic and the dynamic norm.

4. The method of claim 1, wherein the semantic distance is determined further based on a confidence score, which is estimated based on one or more parameters characterizing a distribution pattern of a plurality of similarities measured between the query and the plurality of relevant documents, respectively.

5. The method of claim 4, wherein the one or more parameters characterize a curve formed by connecting the plurality of similarities.

6. The method of claim 1, further comprising computing at least one of:
a novelty score characterizing novelty of the query with respect to the plurality of relevant documents; and
a non-obviousness score characterizing non-obviousness of the query with respect to the plurality of relevant documents.

7. The method of claim 6, further comprising:
computing a distinction index of the query based on the novelty score and/or the non-obviousness score.

8. A machine readable non-transitory medium having information recorded thereon for assessing semantic distance, wherein the information, when read by the machine, causes the machine to perform the following:
receiving, via the communication platform, a query;
obtaining, via a document representation constructor, a first query representation of the query capturing characteristics of the query;
obtaining, via a query representation constructor, a second query representation of the query capturing the characteristics of the query;
determining, via a dynamic norm determiner, a dynamic norm based on a discrepancy between the first and the second query representations, wherein the dynamic norm is indicative of a bias between the document and query representation constructors;
identifying a plurality of documents relevant to the query based on the second query representation; and
for each of the plurality of documents,
computing a similarity between the document represented by a document representation obtained via the document representation constructor and the query represented by the second query representation obtained via the query representation constructor, and
determining a semantic distance between the query and the document based on the dynamic norm and the similarity, wherein the semantic distance is derived by adjusting a distance between the query and the document based on the dynamic norm to address the bias.

9. The medium of claim 8, wherein the determining the dynamic norm comprises:
computing a similarity between the first and the second query representations; and
determining the dynamic norm based on the similarity.

10. The medium of claim 8, wherein the step of the determining the semantic distance comprises:
computing a similarity between the query and each of the plurality of relevant documents;
determining a statistic based on the similarities between the query and the plurality of relevant documents; and
obtaining the semantic distance based on the statistic and the dynamic norm.

11. The medium of claim 8, wherein the semantic distance is determined further based on a confidence score, which is estimated based on one or more parameters characterizing a distribution pattern of a plurality of similarities measured between the query and the plurality of relevant documents, respectively.

12. The medium of claim 11, wherein the one or more parameters characterize a curve formed by connecting the plurality of similarities.

13. The medium of claim 8, wherein the information, when read by the machine, further causing the machine to compute at least one of:
a novelty score characterizing novelty of the query with respect to the plurality of relevant documents; and
a non-obviousness score characterizing non-obviousness of the query with respect to the plurality of relevant documents.

14. The medium of claim 6, wherein the information, when read by the machine, further causing the machine to perform the following:
computing a distinction index of the query based on the novelty score and/or the non-obviousness score.

15. A system for assessing semantic distance, comprising:
a document representation constructor implemented by a processor and configured for obtaining a first query representation of an input query capturing characteristics of the query;
a query representation constructor implemented by the processor and configured for obtaining a second query representation of the input query capturing the characteristics of the query;
a dynamic norm determiner implemented by the processor and configured for determining a dynamic norm based on a discrepancy between the first and the second query representations, wherein the dynamic norm is indicative of a bias between the document and query representation constructors;

a relevant document identifier implemented by the processor and configured for identifying, based on the second query representation, a plurality of documents relevant to the input query, and for each of the plurality of documents, computing a similarity between the document represented by a document representation obtained via the document representation constructor and the query represented by the second query representation obtained via the query representation constructor; and a semantic distance determiner implemented by the processor and configured for determining a semantic distance between the input query and each of the plurality of documents based on the dynamic norm, wherein the semantic distance is derived by adjusting a distance between the query and the document based on the dynamic norm to address the bias.

16. The system of claim 15, wherein the dynamic norm is determined by:

computing a similarity between the first and the second query representations; and determining the dynamic norm based on the similarity.

17. The system of claim 16, wherein the semantic distance is determined by:

computing a similarity between the query and each of the plurality of relevant documents;

determining a statistic based on the similarities between the query and the plurality of relevant documents; and obtaining the semantic distance based on the statistic and the dynamic norm.

18. The system of claim 15, wherein the semantic distance is determined further based on a confidence score, which is estimated based on one or more parameters characterizing a distribution pattern of a plurality of similarities measured between the query and the plurality of relevant documents, respectively.

19. The system of claim 18, wherein the one or more parameters characterize a curve formed by connecting the plurality of similarities.

20. The system of claim 15, further comprising:

a novelty assessment unit implemented by the processor and configured for determining a novelty score characterizing novelty of the input query with respect to the plurality of documents; and a non-obviousness assessment unit implemented by the processor and configured for determining a non-obviousness score characterizing non-obviousness of the input query with respect to the plurality of documents, wherein the novelty score and the non-obviousness score are determined based on semantic distances between the input query and the respective document of the plurality of documents.

21. The system of claim 20, further comprising:

a distinction index determiner implemented by the processor and configured for computing a distinction index of the input query based on the novelty score and/or the non-obviousness score.

* * * * *